(12) United States Patent
Cowgill

(10) Patent No.: US 9,334,811 B2
(45) Date of Patent: May 10, 2016

(54) VALVE CONTROL SYSTEMS AND METHODS FOR HOMOGENOUS CHARGE COMPRESSION IGNITION OPERATION

(75) Inventor: Joel Cowgill, White Lake, MI (US)

(73) Assignee: GM Global Technology Operations LLC, Detroit, MI (US)

(*) Notice: Subject to any disclaimer, the term of this patent is extended or adjusted under 35 U.S.C. 154(b) by 1009 days.

(21) Appl. No.: 13/489,949

(22) Filed: Jun. 6, 2012

(65) Prior Publication Data

US 2013/0332053 A1 Dec. 12, 2013

(51) Int. Cl.
| | |
|---|---|
| F02D 41/26 | (2006.01) |
| F02D 13/02 | (2006.01) |
| F02D 41/00 | (2006.01) |
| F02D 35/02 | (2006.01) |

(52) U.S. Cl.
CPC .......... *F02D 13/0269* (2013.01); *F02D 35/028* (2013.01); *F02D 2041/001* (2013.01); *Y02T 10/128* (2013.01); *Y02T 10/18* (2013.01)

(58) Field of Classification Search
CPC .......................... F02D 2041/001; F02D 35/028
USPC ......................................................... 701/105
See application file for complete search history.

(56) References Cited

U.S. PATENT DOCUMENTS

2008/0046160 A1* 2/2008 Agrell ................. F02D 13/0207
701/101
2013/0054117 A1* 2/2013 Loeffler .............. F02D 41/1401
701/104

FOREIGN PATENT DOCUMENTS

| CN | 1603592 A | 4/2005 |
|---|---|---|
| JP | H10103093 A | 4/1998 |

* cited by examiner

*Primary Examiner* — Hieu T Vo
*Assistant Examiner* — Arnold Castro

(57) ABSTRACT

An engine control method for a vehicle includes: determining a crankshaft angle where a predetermined percentage of fuel injected into a cylinder was combusted during homogenous charge compression ignition (HCCI) operation of an engine; determining a valve closing timing adjustment for one of an intake valve and an exhaust valve of based on the crankshaft angle; generating a valve closing timing for the one of the intake valve and the exhaust valve of the cylinder based on the valve closing timing adjustment; and closing the one of the intake valve and the exhaust valve of the cylinder based on the valve closing timing.

19 Claims, 7 Drawing Sheets

VALVE CONTROL SYSTEMS AND METHODS FOR HOMOGENOUS CHARGE COMPRESSION IGNITION OPERATION

STATEMENT OF GOVERNMENT RIGHTS

Portions or all of this invention may have been produced pursuant to U.S. Government Contract No. DE-FC26-05NT42415. The U.S. Government may therefore have certain rights in this invention.

FIELD

The present disclosure relates to internal combustion engines and more particularly to valve control systems and methods.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Air is drawn into an engine through an intake manifold. A throttle valve and/or engine valve timing controls airflow into the engine. The air mixes with fuel from one or more fuel injectors to form an air/fuel mixture. The air/fuel mixture is combusted within one or more cylinders of the engine. Combustion of the air/fuel mixture may be initiated by, for example, injection of the fuel or spark provided by a spark plug.

Combustion of the air/fuel mixture produces torque and exhaust gas. Torque is generated via heat release and expansion during combustion of the air/fuel mixture. The engine transfers torque to a transmission via a crankshaft, and the transmission transfers torque to one or more wheels via a driveline. The exhaust gas is expelled from the cylinders to an exhaust system.

An engine control module (ECM) controls the torque output of the engine. The ECM may control the torque output of the engine based on driver inputs and/or other inputs. The driver inputs may include, for example, accelerator pedal position, brake pedal position, and/or one or more other suitable driver inputs. The other inputs may include, for example, cylinder pressure measured using a cylinder pressure sensor, one or more variables determined based on the measured cylinder pressure, and/or one or more other suitable values.

SUMMARY

An engine control system for a vehicle includes an angle determination module and an exhaust valve control module. The angle determination module determines a crankshaft angle at which a predetermined percentage of fuel injected into a cylinder was combusted during homogenous charge compression ignition (HCCI) operation of an engine. The exhaust valve control module determines an exhaust valve closing timing adjustment based on the crankshaft angle, generates an exhaust valve closing timing for the cylinder based on the exhaust valve closing timing adjustment, and controls closing of an exhaust valve of the cylinder based on the exhaust valve closing timing.

In other features, an engine control system for a vehicle includes an angle determination module and an intake valve control module. The angle determination module determines a crankshaft angle where a predetermined percentage of fuel injected into a cylinder was combusted during homogenous charge compression ignition (HCCI) operation of an engine. The intake valve control module determines an intake valve closing timing adjustment based on the crankshaft angle, generates an intake valve closing timing for the cylinder based on the intake valve closing timing adjustment, and controls closing of an intake valve of the cylinder based on the intake valve closing timing.

In still other features, an engine control method for a vehicle includes: determining a crankshaft angle where a predetermined percentage of fuel injected into a cylinder was combusted during homogenous charge compression ignition (HCCI) operation of an engine; determining a valve closing timing adjustment for one of an intake valve and an exhaust valve of based on the crankshaft angle; generating a valve closing timing for the one of the intake valve and the exhaust valve of the cylinder based on the valve closing timing adjustment; and closing the one of the intake valve and the exhaust valve of the cylinder based on the valve closing timing.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

An engine control module (ECM) controls opening and closing of intake valves and exhaust valves of an engine. Using a fully flexible valve actuation (FFVA) system, the ECM can control opening and closing of an intake valve of a cylinder separately from an exhaust valve of the cylinder.

Performance of an engine is generally dictated by a least efficient (worst performing) cylinder of the engine. The ECM of the present disclosure may improve performance of the engine by controlling the intake or exhaust valves of the cylinders, respectively, to achieve desired combustion characteristics across all of the cylinders. Balancing the combustion characteristics across the cylinders may improve the performance of the engine.

Figure 1:
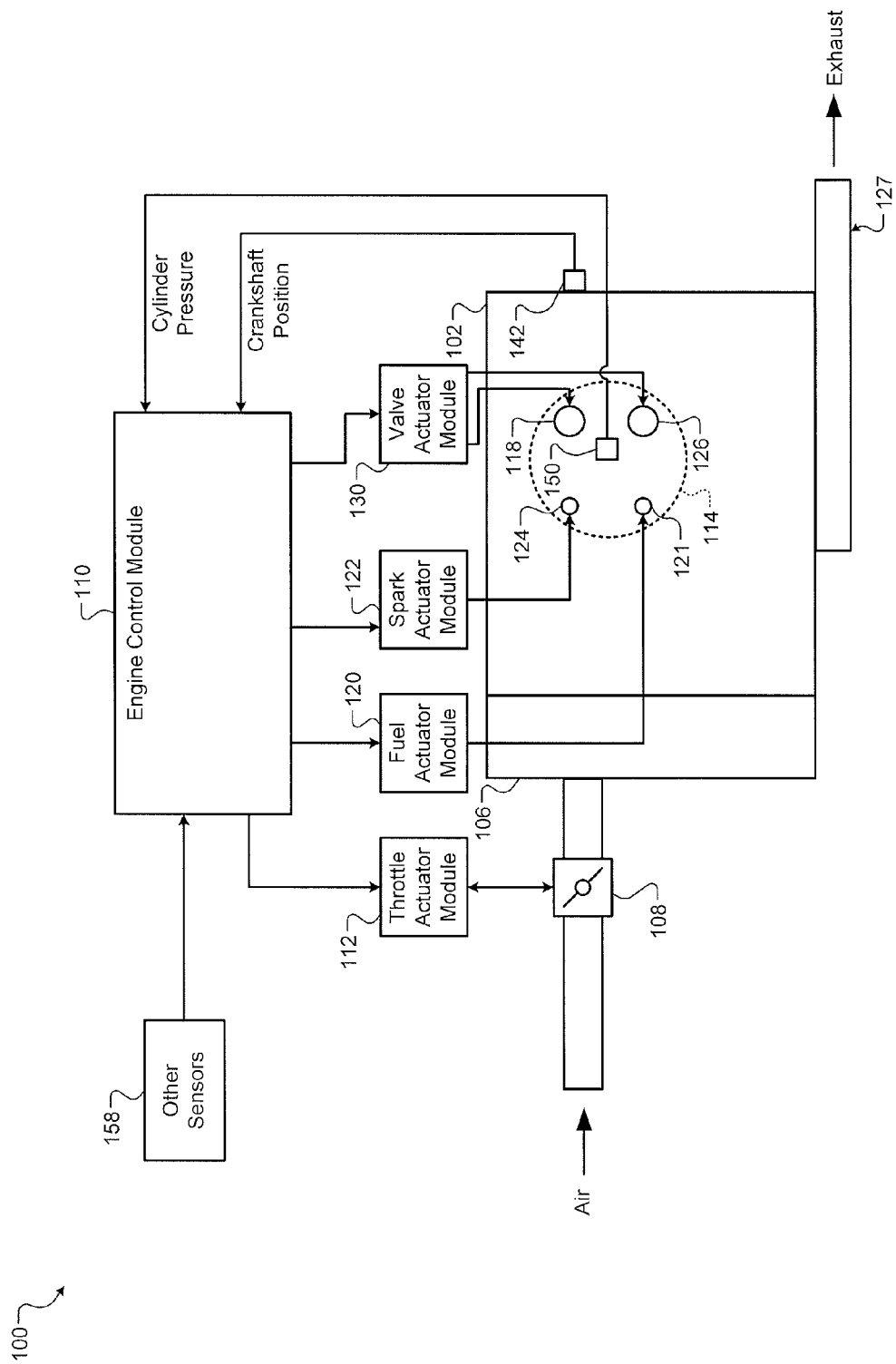
FIG. 1 is a functional block diagram of an example engine system according to the present disclosure.

Referring now to FIG. 1, a functional block diagram of an example engine system 100 is presented. The engine system 100 includes an engine 102 that combusts an air/fuel mixture to produce drive torque for a vehicle. While the engine 102 will be discussed as a spark ignition direct injection (SIDI) engine, the engine 102 may include another suitable type of engine that operates or selectively operates using homogenous charge compression ignition (HCCI). One or more electric motors and/or motor generator units (MGUs) may be used with the engine 102.

Air is drawn into an intake manifold 106 through a throttle valve 108. The throttle valve 108 may vary airflow into the intake manifold 106. For example only, the throttle valve 108 may include a butterfly valve having a rotatable blade. An engine control module (ECM) 110 controls a throttle actuator module 112 (e.g., an electronic throttle controller or ETC), and the throttle actuator module 112 controls opening of the throttle valve 108.

Air from the intake manifold 106 is drawn into cylinders of the engine 102. While the engine 102 may include more than one cylinder, only a single representative cylinder 114 is shown. Air from the intake manifold 106 is drawn into the cylinder 114 through one or more intake valves, such as intake valve 118. One or more intake valves may be provided with each cylinder. Timing of opening and closing of the intake valve(s) may control flow into or out of the cylinder.

The ECM 110 controls a fuel actuator module 120, and the fuel actuator module 120 controls fuel injection (e.g., amount and timing) by a fuel injector 121. The fuel injector 121 injects fuel into the cylinder 114. Fuel is provided to the fuel injector 121 by a low pressure fuel pump and a high pressure fuel pump (not shown). The low pressure fuel pump draws fuel from a fuel tank and provides fuel at low pressures to the high pressure fuel pump. The high pressure fuel pump selectively further pressurizes the fuel, for example, for direct injection into the cylinders of the engine 102. A fuel injector may be provided for each cylinder.

The injected fuel mixes with air and creates an air/fuel mixture in the cylinder 114. A piston (not shown) within the cylinder 114 compresses the air/fuel mixture. Based upon a signal from the ECM 110, a spark actuator module 122 may energize a spark plug 124 in the cylinder 114. Spark generated by the spark plug 124 ignites the air/fuel mixture during spark ignition (SI) operation of the engine 102. The timing of the spark may be specified relative to the time when the piston is at its topmost position, referred to as top dead center (TDC). During homogenous charge compression ignition (HCCI) operation of the engine 102, heat generated by compression causes ignition. The ECM 110 may control whether the engine 102 operates using SI or HCCI. The ECM 110 may determine whether to operate the engine 102 using HCCI or SI, for example, based on engine speed, engine load, and/or one or more other suitable parameters.

Combustion of the air/fuel mixture drives the piston away from the TDC position, and the piston drives rotation of a crankshaft (not shown). After reaching a bottom most position, referred to as bottom dead center (BDC), the piston begins moving toward the TDC position again and expels contents of the cylinder 114 through one or more exhaust valves, such as exhaust valve 126. One or more exhaust valves may be provided for each cylinder. The byproducts of combustion are exhausted from the vehicle via an exhaust system 127. Timing of opening and closing of the exhaust valve(s) may control flow into or out of the cylinder.

A valve actuator module 130 controls opening and closing of the intake valves and the exhaust valves of the engine 102 based on signals from the ECM 110. In camshaft-based valve actuation systems, opening and closing of the intake valve(s) a cylinder are not generally controlled separately from one another or separately from opening and closing of exhaust valve(s) of the cylinder. The valve actuator module 130, however, can control opening and closing of the intake valve(s) of each cylinder separately from one another as well as independently from opening and closing of the exhaust valve(s) of the cylinders, respectively. The valve actuator module 130 can also control opening and closing of the intake and exhaust valves of a cylinder separately from opening and closing of the intake and exhaust valves of one or more other cylinders.

For example only, the valve actuator module 130 may include an electro-hydraulic actuation system, an electro-mechanical actuation system, or another suitable type of actuation system. Where the valve actuator module 130 includes an electro-hydraulic actuation system, for example, the valve actuator module 130 can control application of hydraulic fluid to the intake valve(s) of a cylinder and application of the hydraulic fluid to the exhaust valve(s) of the cylinder separately. The valve actuator module 130 provides what may be referred to as fully flexible valve actuation (FFVA).

Using FFVA, the flow of gasses into and out of each cylinder can be regulated (via control of intake and exhaust valve opening and closing) to control the flow into and out of the cylinder and, therefore, the combustion conditions within each cylinder. As overall engine performance is dictated by a least efficient (worst performing) one of the cylinders, the ability to balance the performance of the cylinders may improve the overall engine performance. For example, exhaust valve closing timing of a cylinder may be adjusted (advanced or retarded) to control the amount of residual exhaust trapped of the cylinder. Intake valve closing timing may be adjusted to control a compression ratio within the cylinder.

A crankshaft position sensor 142 monitors rotation of the crankshaft and generates a crankshaft position signal based on the rotation of the crankshaft. For example only, the crankshaft position sensor 142 may include a variable reluctance (VR) sensor or another suitable type of crankshaft position sensor. The crankshaft position signal may include a pulse train. A pulse may be generated in the crankshaft position signal as a tooth of a P-toothed wheel (not shown) that rotates with the crankshaft passes the crankshaft position sensor 142, where P is an integer greater than one. Accordingly, each pulse corresponds to an angular rotation of the crankshaft by an amount approximately equal to 360° divided by P teeth. The P-toothed wheel may also include a gap of one or more missing teeth, and the gap may be used as an indicator of one complete revolution of the crankshaft (i.e., 360° of crankshaft rotation).

A cylinder pressure sensor 150 may be provided that measures pressure within the cylinder 114 and that generates a cylinder pressure signal based on the pressure. A cylinder pressure sensor may be provided for each cylinder of the engine 102. In various implementations, the cylinder pressure sensor 150 may be omitted, and the pressure within the cylinder 114 (cylinder pressure) may be inferred (determined) based on one or more other measured parameters.

One or more other sensors 158 may also be implemented. For example, the other sensors 158 may include a mass air flowrate (MAF) sensor, a manifold absolute pressure (MAP) sensor, an intake air temperature (IAT) sensor, a coolant temperature sensor, and/or one or more other suitable sensors.

The ECM 110 of the present disclosure determines a crankshaft angle (CA) at which fifty percent of injected fuel was burned during a combustion event of the cylinder 114. The crankshaft angle at which fifty percent of the injected fuel was burned during a combustion event may be referred to as CA50. The ECM 110 controls exhaust valve closing timing or intake valve closing timing of each cylinder based on the CA50s for the cylinders, respectively. While control of intake and exhaust valve closing timing based on CA50 will be discussed, the present application is also applicable to controlling intake and exhaust closing timing based on crankshaft angle at which another suitable percentage of fuel was burned or based on one or more other suitable parameters/metrics.

Figure 2:
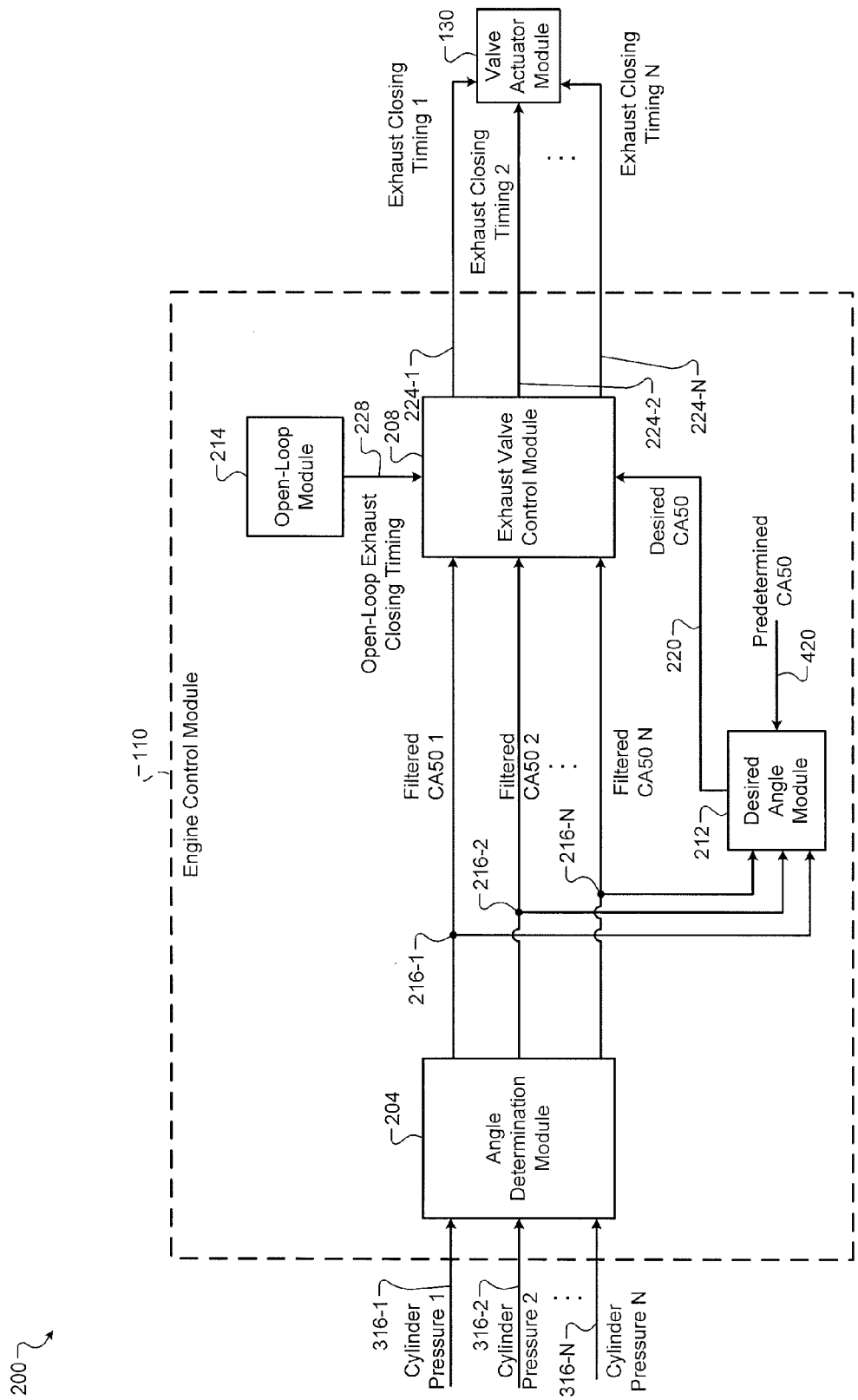
FIG. 2 is a functional block diagram of an example exhaust valve control system according to the present disclosure.

Referring now to FIG. 2, a functional block diagram of an example exhaust valve control system 200 is presented. The ECM 110 may include an angle determination module 204 (see also FIG. 3), an exhaust valve control module 208 (see also FIG. 4), a desired angle module 212, and an open-loop module 214.

The angle determination module 204 generates CA50s for the combustion events of the cylinders, respectively. The angle determination module 204 applies a filter to the CA50s to generate filtered CA50s 216-1, 216-2, . . . , 216-N (hereafter "filtered CA50s 216") for the cylinders, respectively. N is an integer greater than one and is equal to the number of cylinders of the engine 102. The CA50s are filtered to provide average CA50s over a predetermined period. In various implementations, the averaging/filtering may be done in another suitable manner.

The exhaust valve control module 208 determines closed-loop timing adjustments for the cylinders based on the filtered CA50s 216, respectively, and a desired CA50 220 (e.g., in crank angle degrees) set for all of the cylinders. The exhaust valve control module 208 determines exhaust valve closing timings 224-1, 224-2, . . . , 224-N (hereafter "exhaust valve closing timings 224") for the cylinders based on the closed-loop adjustments, respectively. The exhaust valve closing timings 224 may be expressed, for example, in crank angle degrees. The exhaust valve control module 208 determines the exhaust valve closing timings 224 further based on an open-loop exhaust valve closing timing 228 (e.g., in crank angle degrees) set for all of the cylinders. The exhaust valve control module 208 controls closing of the exhaust valve(s) of the cylinders based on the exhaust valve closing timings 224, respectively, via the valve actuator module 130.

Figure 3:
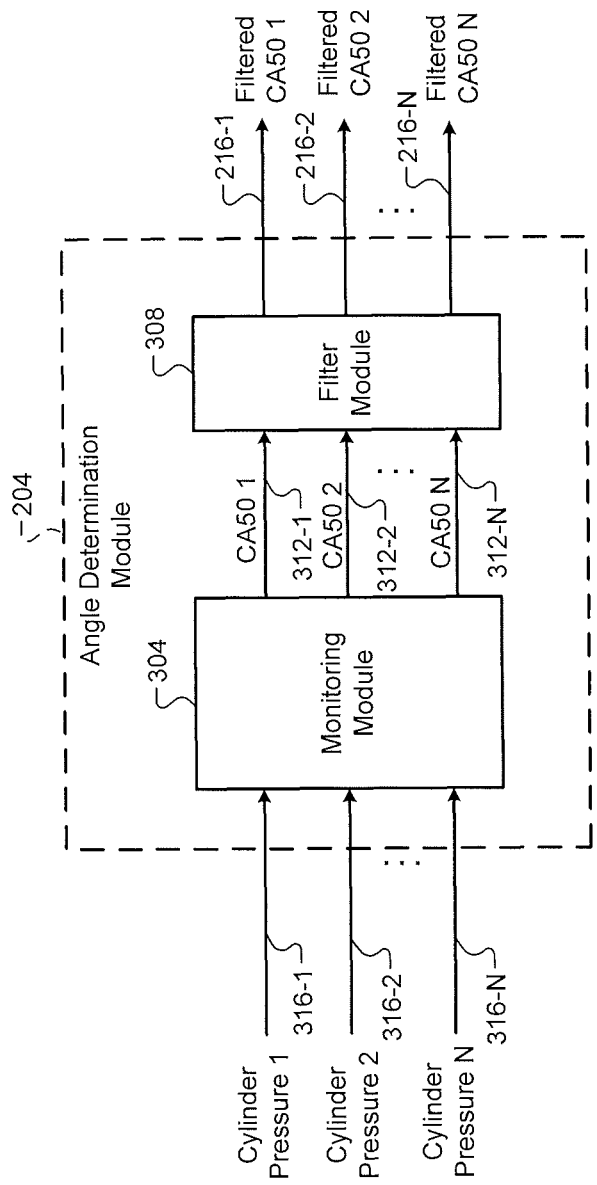
FIG. 3 is a functional block diagram of an example angle determination module according to the present disclosure.

FIG. 3 includes a functional block diagram of an example implementation of the angle determination module 204 is presented. Referring now to FIGS. 2 and 3, the angle determination module 204 includes a monitoring module 304. The angle determination module 204 also includes a filter module 308.

The monitoring module 304 determines CA50s 312-1, 312-2, . . . , 312-N (hereafter "CA50s 312") for the combustion events of the cylinders, respectively. The monitoring module 304 monitors cylinder pressures 316-1, 316-2, . . . , 316-N (hereafter "cylinder pressures 316") of the cylinders and determines the CA50s 312 based on the cylinder pressures 316, respectively. For example only, the monitoring module 304 determines the CA50 312-1 for a combustion event of a first cylinder based on the cylinder pressure 316-1 during the combustion event of the first cylinder. The cylinder pressure 316-1 may be measured using a cylinder pressure sensor or determined based on one or more other measured parameters. The monitoring module 304 may determine the CA50s 312 for the other cylinders similarly.

The filter module 308 applies a filter to the CA50s 312 of the cylinders to generate the filtered CA50s 216, respectively. For example only, the filter module 308 applies the filter to the CA50s 312-1 of the first cylinder to generate the filtered CA50 216-1 for the first cylinder. The filter may be, for example, an averaging filter, such as a weighted moving averaging filter, an exponentially weighted moving average filter, a traditional averaging filter, or another suitable type of filter.

The filtering may include M of the last CA50s for the cylinders, respectively, where M is an integer greater than one. The filter module 308 may generate the filtered CA50s 216 for the other cylinders similarly.

Figure 4:
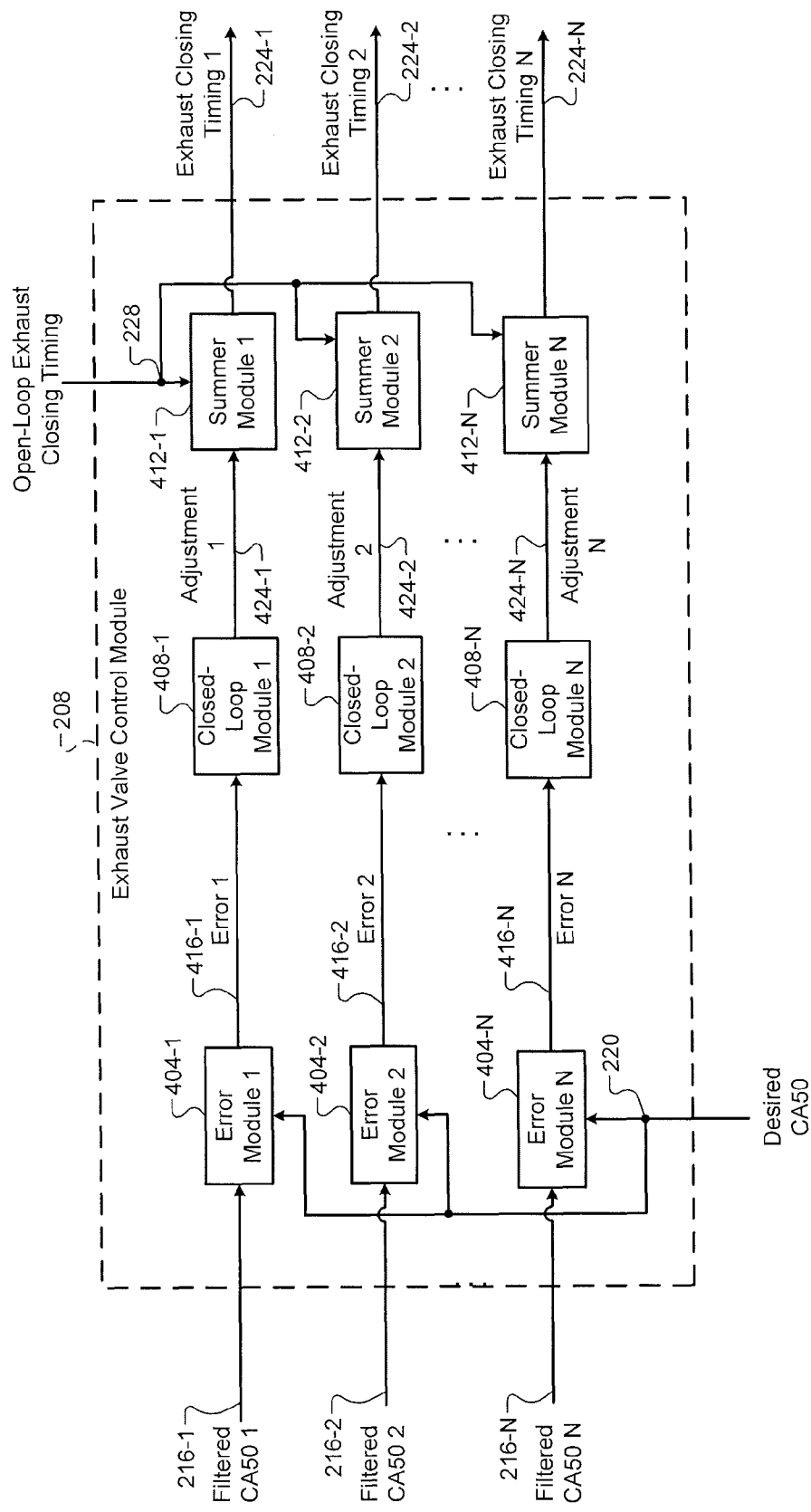
FIG. 4 is a functional block diagram of an example exhaust valve control module according to the present disclosure.

FIG. 4 includes a functional block diagram of an example implementation of the exhaust valve control module 208. Referring now to FIGS. 2 and 4, the exhaust valve control module 208 includes error modules 404-1, 404-2, . . . 404-N (hereafter "error modules 404"). The exhaust valve control module 208 also includes closed-loop modules 408-1, 408-2, . . . 408-N (hereafter "closed-loop modules 408") and summer modules 412-1, 412-2, . . . 412-N (hereafter "summer modules 412").

The error modules 404 determine errors 416-1, 416-2, . . . 416-N (hereafter "errors 416") for the cylinders based on differences between the filtered CA50s 216 of the cylinders, respectively, and the desired CA50 220. For example only, the error module 404-1 determines the error 416-1 for the first cylinder based on a difference between the filtered CA50 216-1 of the first cylinder and the desired CA50 220. The other error modules 404 may determine the errors 416 for the other cylinders similarly. The errors 416 may be expressed, for example, in crank angle degrees.

The desired angle module 212 determines the desired CA50 220 for all of the cylinders. The desired angle module 212 may determine the desired CA50 220, for example, by setting the desired CA50 220 at a given time to either: a predetermined CA50 420 (e.g., in crank angle degrees); or one of the filtered CA50s 216 of one of the cylinders, respectively. When the desired CA50 220 is set to the predetermined CA50 420, the valve closing timings of the cylinders are all controlled in closed-loop to achieve the predetermined CA50 420. When the desired CA50 220 is set to one of the filtered CA50s 216 of one of the cylinders, the valve closing timings of the each of the other cylinders, respectively, are controlled in closed-loop to achieve the one of the filtered CA50s 216 of the one of the cylinders. In this manner, combustion phasing can be balanced across the cylinders.

The closed-loop modules 408 determine closed-loop adjustments 424-1, 424-2, . . . , 424-N (hereafter "closed-loop adjustments 424") for the cylinders based on the errors 416 of the cylinders, respectively. For example only, the closed-loop module 408-1 determines the closed-loop adjustment 424-1 for the first cylinder based on the error 416-1 of the first cylinder. The other closed-loop modules 408 may determine the closed-loop adjustments 424 for the other cylinders similarly. The closed-loop adjustments 424 may be expressed, for example, in crank angle degrees.

The closed-loop modules 408 determine the closed-loop adjustments 424 for the cylinders based on the errors 416, respectively, using a closed-loop control scheme. The closed-loop control scheme may include a proportional-integral-derivative (PID) based control scheme, such as a proportional (P) control scheme, a proportional-integral (PI) control scheme, or another suitable closed-loop control scheme.

The summer modules 412 determine the exhaust valve closing timings 224 for the cylinders based on sums of the closed-loop adjustments 424 for the cylinders, respectively, and the open-loop timing 228. For example only, the summer module 412-1 determines the exhaust valve closing timing 224-1 for the exhaust valve(s) of the first cylinder based on a sum of the closed-loop adjustment 424-1 for the first cylinder and the open-loop timing 228. The summer module 412-1 may, for example, set the exhaust valve closing timing 224-1 equal to the open-loop timing 228 plus the closed-loop adjustment 424-1. The other summer modules 412 may determine the exhaust valve closing timings 224 for the other cylinders similarly. The open-loop module 214 may, for example, set the open-loop timing 228 to a predetermined timing or based on one or more parameters, such as engine speed, engine load, and/or one or more other suitable parameters.

Figure 5:
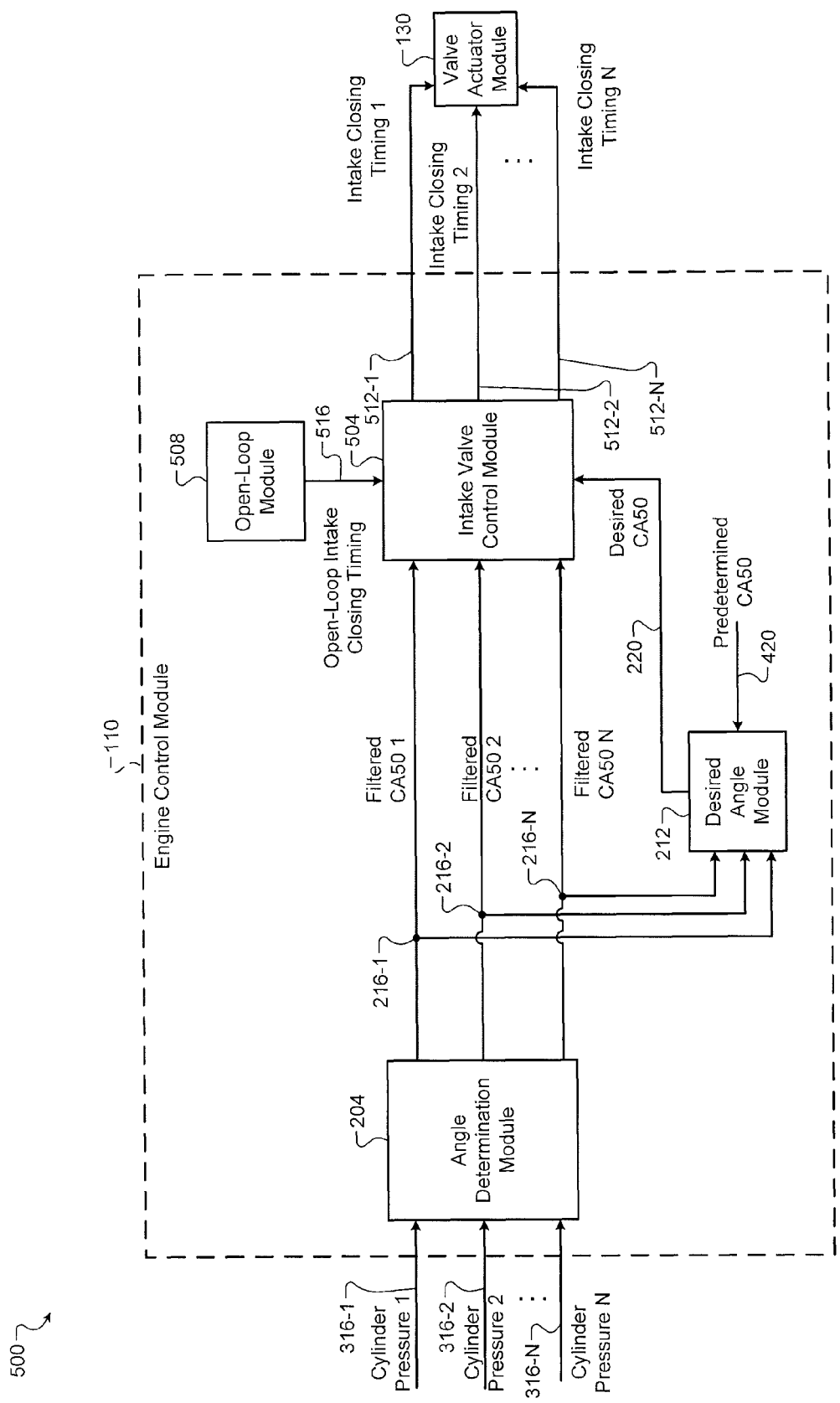
FIG. 5 is a functional block diagram of an example intake valve control system according to the present disclosure.

While controlling exhaust valve closing timing is discussed above in conjunction with the examples of FIGS. 2-4, the present disclosure is also applicable to controlling intake valve closing timing. FIG. 5 includes a functional block diagram of an example implementation of an intake valve control system 500 that controls intake valve closing timing. Control via exhaust valve or intake valve closing can be mutually exclusive, used in conjunction, or scheduled by the ECM 110.

Referring now to FIG. 5, the ECM 110 may include the angle determination module 204, the desired angle module 212, an intake valve control module 504 (see also FIG. 6), and an open-loop module 508. The angle determination module 204 generates the filtered CA50s 216 for the cylinders, respectively, as discussed above.

The intake valve control module 504 determines closed-loop timing adjustments for the cylinders based on the filtered CA50s 216, respectively, and the desired CA50 220. The intake valve control module 504 determines intake valve closing timings 512-1, 512-2, . . . 512-N (hereafter "intake valve closing timings 512") for the cylinders based on the closed-loop adjustments, respectively. The intake valve closing timings 512 may be expressed, for example, in crank angle degrees. The intake valve control module 504 determines the intake valve closing timings 512 further based on an open-loop intake valve closing timing 516 (e.g., in crank angle degrees) set for all of the cylinders. The intake valve control module 504 controls closing of the intake valve(s) of the cylinders based on the intake valve closing timings 512, respectively, via the valve actuator module 130.

Figure 6:
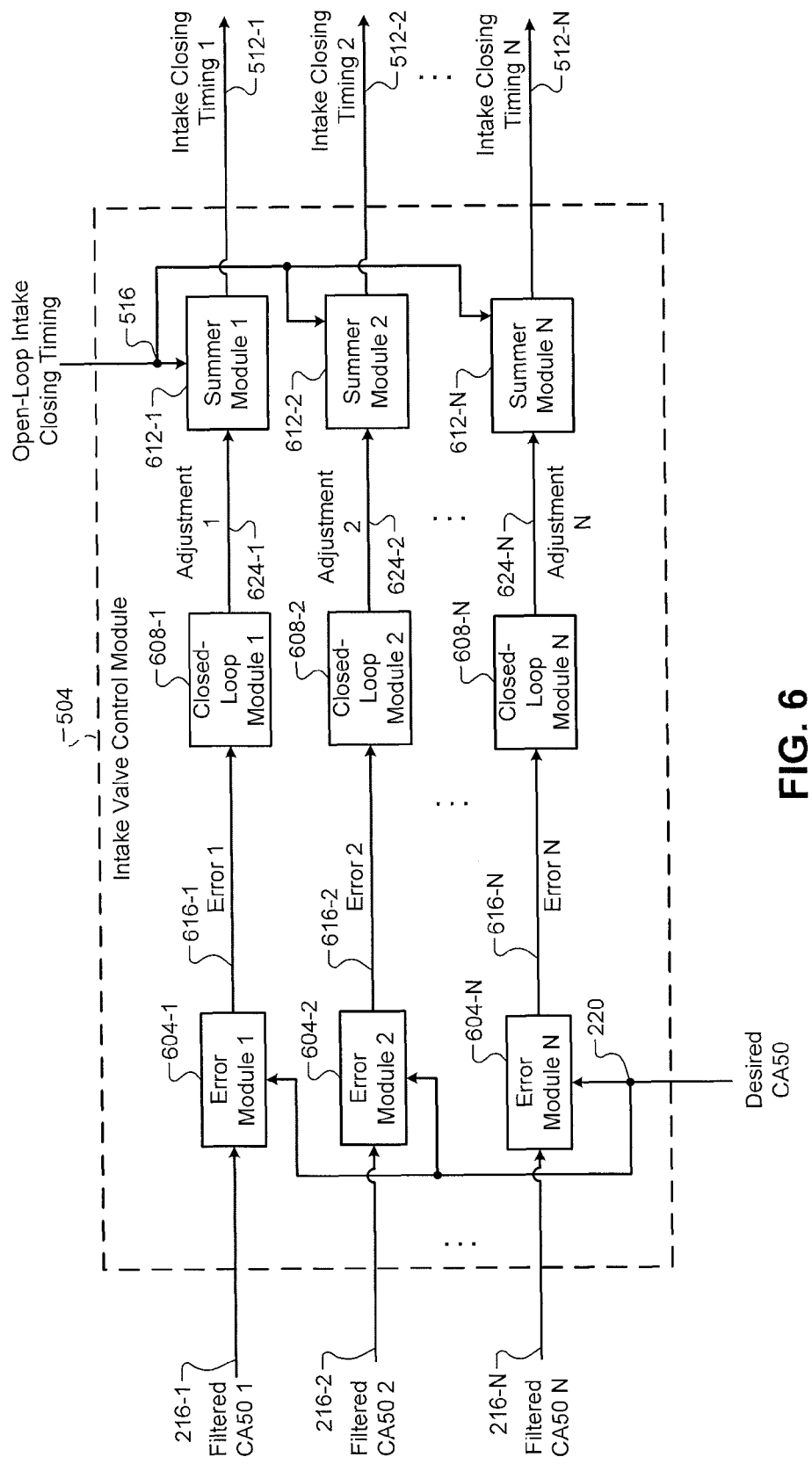
FIG. 6 is a functional block diagram of an example intake valve control module according to the present disclosure.

Referring now to FIG. 6, a functional block diagram of an example implementation of the intake valve control module 504 is presented. Referring now to FIGS. 5 and 6, the intake valve control module 504 includes error modules 604-1, 604-2, . . . 604-N (hereafter "error modules 604"). The intake valve control module 504 also includes closed-loop modules 608-1, 608-2, . . . 608-N (hereafter "closed-loop modules 608") and summer modules 612-1, 612-2, . . . 612-N (hereafter "summer modules 612").

The error modules 604 determine errors 616-1, 616-2, . . . 616-N (hereafter "errors 616") for the cylinders based on differences between the filtered CA50s 216 of the cylinders, respectively, and the desired CA50 220. For example only, the error module 604-1 determines the error 616-1 for the first cylinder based on a difference between the filtered CA50 216-1 of the first cylinder and the desired CA50 220. The other error modules 604 may determine the errors 616 for the other cylinders similarly. The errors 616 may be expressed, for example, in crank angle degrees.

The closed-loop modules 608 determine closed-loop adjustments 624-1, 624-2, . . . 624-N (hereafter "closed-loop adjustments 624") for the cylinders based on the errors 616 of the cylinders, respectively. For example only, the closed-loop module 608-1 determines the closed-loop adjustment 624-1 for the first cylinder based on the error 616-1 of the first cylinder. The other closed-loop modules 608 may determine the closed-loop adjustments 624 for the other cylinders similarly. The closed-loop adjustments 624 may be expressed, for example, in crank angle degrees. The closed-loop modules 608 determine the closed-loop adjustments 624 for the cylinders based on the errors 616, respectively, using a closed-loop control scheme. The closed-loop control scheme may include a proportional-integral-derivative (PID) control scheme, such as a proportional (P) control scheme, a proportional-integral (PI) control scheme, or another suitable closed-loop control scheme.

The summer modules 612 determine the intake valve closing timings 512 for the cylinders based on a sum of the closed-loop adjustments 624 for the cylinders, respectively, and the open-loop timing 516. For example only, the summer module 612-1 determines the intake valve closing timing 512-1 for the intake valve(s) of the first cylinder based on a sum of the closed-loop adjustment 624-1 for the first cylinder and the open-loop timing 516. The summer module 612-1 may, for example, set the intake valve closing timing 512-1 equal to the open-loop timing 516 plus the closed-loop adjustment 624-1. The other summer modules 612 may determine the intake valve closing timings 512 for the other cylinders similarly. The open-loop module 508 may, for example, set the open-loop timing 516 to a predetermined timing or based on one or more parameters, such as engine speed, engine load, and/or one or more other suitable parameters.

Figure 7:
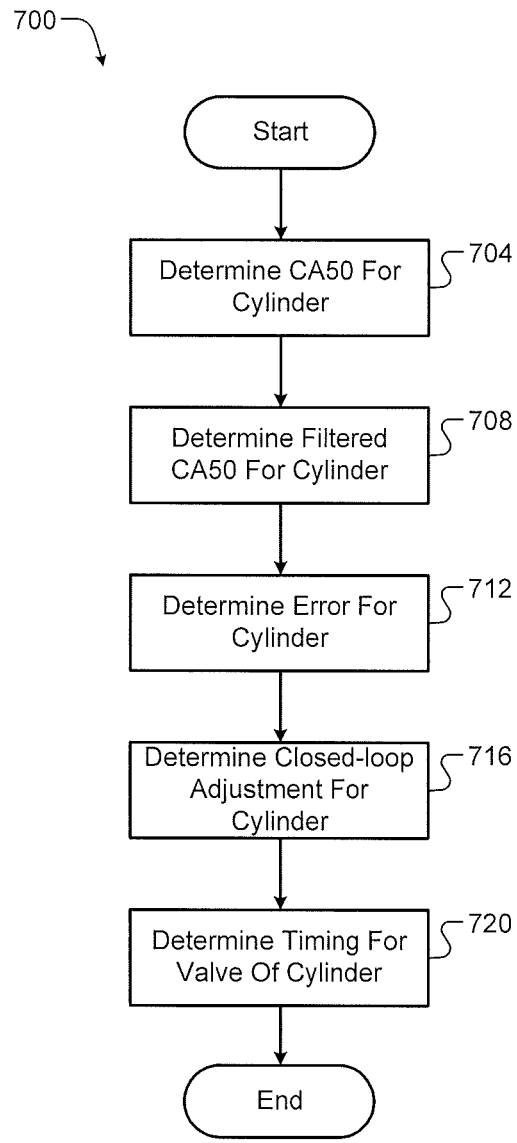
FIG. 7 is a flowchart depicting an example method of controlling intake or exhaust valve closing according to the present disclosure.

Referring now to FIG. 7, a flowchart depicting an example method of controlling closing timing of a valve of a cylinder during HCCI operation of the engine 102 is presented. The valve may be either an intake valve of the cylinder or an exhaust valve of the cylinder. Control may begin with 704 where control determines the CA50 for a combustion event of the cylinder. Control determines the CA50 for the combustion event based on the pressure within the cylinder (cylinder pressure) during the combustion event. The cylinder pressure may be, for example, measured using a cylinder pressure sensor or determined based on one or more other measured parameters.

At 708, control determines the filtered CA50 for the cylinder. Control determines the filtered CA50 for the cylinder based on the CA50 and CA50(s) for one or more previous combustion events of the cylinder. For example only, control may set the filtered CA50 for the cylinder equal to an average of the CA50 and the CA50s for M previous combustion events of the cylinder, where M is an integer greater than zero.

Control determines the error for the cylinder at 712. Control determines the error for the cylinder based on the filtered CA50 of the cylinder and the desired CA50 220. The desired CA50 may be set to, for example, the predetermined CA50 420 for all of the cylinders, one of the filtered CA50s of another one of the cylinders of the engine 102, or another suitable CA50.

At 716, control determines the closed-loop adjustment for the cylinder. Control determines the closed-loop adjustment for the cylinder based on the error of the cylinder and using a closed-loop control scheme, such as a P control scheme, a PI control scheme, or another suitable closed-loop control scheme.

Control determines the closing timing for the valve of the cylinder at 720 based on an open-loop closing timing and the closed-loop adjustment for the cylinder. Control may, for example, set the closing timing for the valve of the cylinder based on or equal to a sum of the open-loop closing timing and the closed-loop adjustment for the cylinder. Control may perform the method 700 for each cylinder of the engine 102 to balance combustion phasing across the cylinders of the engine 102.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

What is claimed is:

1. An engine control system for a vehicle, comprising:
   an angle determination module that determines a crankshaft angle at which a predetermined percentage of fuel injected into a cylinder was combusted during homogenous charge compression ignition (HCCI) operation of an engine,
   wherein the angle determination module determines a second crankshaft angle for the cylinder where the predetermined percentage of fuel was combusted during HCCI operation of the engine and determines the crankshaft angle based on an average of the second crankshaft angle and at least one other crankshaft angle; and
   an exhaust valve control module that determines an exhaust valve closing timing adjustment based on the crankshaft angle, that generates an exhaust valve closing timing for the cylinder based on the exhaust valve closing timing adjustment, and that controls closing of an exhaust valve of the cylinder based on the exhaust valve closing timing.

2. The engine control system of claim 1 wherein the exhaust valve control module determines the exhaust valve closing timing adjustment based on a difference between the crankshaft angle and a desired crankshaft angle.

3. The engine control system of claim 2 further comprising a desired angle module that sets the desired crankshaft angle to a predetermined crankshaft angle.

4. The engine control system of claim 2 further comprising a desired angle module that sets the desired crankshaft angle to one of the crankshaft angle and a second crankshaft angle where the predetermined percentage of fuel injected into a second cylinder was combusted during HCCI operation of the engine.

5. The engine control system of claim 2 wherein the exhaust valve control module generates the exhaust valve closing timing for the cylinder further based on an open-loop exhaust valve closing timing.

6. The engine control system of claim 5 wherein the exhaust valve control module sets the exhaust valve closing timing based on a sum of the exhaust valve closing timing adjustment and the open-loop exhaust valve closing timing.

7. An engine control method for a vehicle, comprising:
   determining a crankshaft angle where a predetermined percentage of fuel injected into a cylinder was combusted during homogenous charge compression ignition (HCCI) operation of an engine;
   determining a valve closing timing adjustment for one of an intake valve and an exhaust valve of based on a difference between the crankshaft angle and a desired crankshaft angle;
   generating a valve closing timing for the one of the intake valve and the exhaust valve of the cylinder based on a sum of the valve closing timing adjustment and an open-loop valve closing timing set for the one of the intake valve and the exhaust valve of the cylinder; and
   closing the one of the intake valve and the exhaust valve of the cylinder based on the valve closing timing.

8. An engine control system for a vehicle, comprising:
   an angle determination module that determines a crankshaft angle where a predetermined percentage of fuel injected into a cylinder was combusted during homogenous charge compression ignition (HCCI) operation of an engine,
   wherein the angle determination module determines a second crankshaft angle for the cylinder where the predetermined percentage of fuel was combusted during HCCI operation of the engine and determines the crankshaft angle based on an average of the second crankshaft angle and at least one other crankshaft angle; and
   an intake valve control module that determines an intake valve closing timing adjustment based on the crankshaft angle, that generates an intake valve closing timing for the cylinder based on the intake valve closing timing adjustment, and that controls closing of an intake valve of the cylinder based on the intake valve closing timing.

9. The engine control system of claim 8 wherein the intake valve control module determines the intake valve closing timing adjustment based on a difference between the crankshaft angle and a desired crankshaft angle.

10. The engine control system of claim 9 further comprising a desired angle module that sets the desired crankshaft angle to a predetermined crankshaft angle.

11. The engine control system of claim 9 further comprising a desired angle module that sets the desired crankshaft angle to one of the crankshaft angle and a second crankshaft angle where the predetermined percentage of fuel injected into a second cylinder was combusted during HCCI operation of the engine.

12. The engine control system of claim 9 wherein the intake valve control module generates the intake valve closing timing for the cylinder further based on an open-loop intake valve closing timing.

13. The engine control system of claim 12 wherein the intake valve control module sets the intake valve closing timing based on a sum of the intake valve closing timing adjustment and the open-loop intake valve closing timing.

14. An engine control system for a vehicle, comprising:
an angle determination module that determines a crankshaft angle at which a predetermined percentage of fuel injected into a cylinder was combusted during homogenous charge compression ignition (HCCI) operation of an engine; and
at least one of:
- an exhaust valve control module that determines an exhaust valve closing timing adjustment based on a difference between the crankshaft angle and a desired crankshaft angle, that sets an exhaust valve closing timing for the cylinder based on a sum of the exhaust valve closing timing adjustment and an open-loop exhaust valve closing timing, and that controls closing of an exhaust valve of the cylinder based on the exhaust valve closing timing; and
- an intake valve control module that determines an intake valve closing timing adjustment based on a difference between the crankshaft angle and a desired crankshaft angle, that generates an intake valve closing timing for the cylinder based on a sum of the intake valve closing timing adjustment and an open-loop intake valve closing timing, and that controls closing of an intake valve of the cylinder based on the intake valve closing timing.

15. An engine control method for a vehicle, comprising:
determining a crankshaft angle where a predetermined percentage of fuel injected into a cylinder was combusted during homogenous charge compression ignition (HCCI) operation of an engine;
determining a second crankshaft angle for the cylinder where the predetermined percentage of fuel was combusted during HCCI operation of the engine,
wherein determining the crankshaft angle includes determining the crankshaft angle based on an average of the second crankshaft angle and at least one other crankshaft angle;
determining a valve closing timing adjustment for one of an intake valve and an exhaust valve of based on the crankshaft angle;
generating a valve closing timing for the one of the intake valve and the exhaust valve of the cylinder based on the valve closing timing adjustment; and
closing the one of the intake valve and the exhaust valve of the cylinder based on the valve closing timing.

16. The engine control method of claim 15 further comprising determining the valve closing timing adjustment based on a difference between the crankshaft angle and a desired crankshaft angle.

17. The engine control method of claim 16 further comprising setting the desired crankshaft angle to a predetermined crankshaft angle.

18. The engine control method of claim 16 further comprising setting the desired crankshaft angle to one of the crankshaft angle and a second crankshaft angle where the predetermined percentage of fuel injected into a second cylinder was combusted during HCCI operation of the engine.

19. The engine control method of claim 16 further comprising generating the valve closing timing for the cylinder further based on a sum of the valve closing timing adjustment and an open-loop valve closing timing set for the one of the intake valve and the exhaust valve of the cylinder.

* * * * *